United States Patent
Berke et al.

(12)

(10) Patent No.: US 6,533,210 B1
(45) Date of Patent: Mar. 18, 2003

(54) FISHING LINE WINDING APPARATUS

(75) Inventors: Joseph J. Berke, 3248 Interlaken, West Bloomfield, MI (US) 48323; Charles T. Michael, Troy, MI (US)

(73) Assignee: Joseph J. Berke, West Bloomfield, MI (US)

( * ) Notice: Subject to any disclaimer, the term of this patent is extended or adjusted under 35 U.S.C. 154(b) by 187 days.

(21) Appl. No.: 09/665,645

(22) Filed: Sep. 19, 2000

(51) Int. Cl.⁷ .............................................. B65H 54/00
(52) U.S. Cl. ..................... 242/470; 242/390.8; 242/902
(58) Field of Search .......................... 242/470, 390.8, 242/390.9, 902, 395

(56) References Cited

U.S. PATENT DOCUMENTS

| | | | | |
|---|---|---|---|---|
| 4,007,886 A | * | 2/1977 | Kaminstein | 242/470 |
| 4,540,136 A | * | 9/1985 | Rauch | 242/902 |
| 4,588,139 A | * | 5/1986 | Lines | 242/470 |
| 4,795,107 A | * | 1/1989 | Williams | 242/902 |
| 5,794,883 A | * | 8/1998 | MacEwen | 242/902 |
| 5,906,329 A | * | 5/1999 | Wesley, Sr. | 242/902 |
| 6,260,785 B1 | * | 7/2001 | Prais | 242/902 |

* cited by examiner

*Primary Examiner*—William A. Rivera
(74) *Attorney, Agent, or Firm*—Alex Rhodes

(57) ABSTRACT

A fishing line winding apparatus for removing and installing fishing lines on a variety of fishing reels. In a first aspect of the invention, an electric motor drives a belt apparatus to transfer a fishing line between a fishing reel and a storage spool. The motor is positioned in a linear arrangement between the fishing reel and the storage spool. Fishing lines are installed and removed by reversing the direction of rotation of the motor. The belt apparatus includes resiliently mounted pair of idler pulleys which remove belt slack and increase belt wrap. An electronic control system is used to reverse and vary the speed of the motor. In a second aspect of the invention, the belt apparatus is driven by a manual crank. Both aspects of the invention are portable and enclosed in a case.

25 Claims, 6 Drawing Sheets

FISHING LINE WINDING APPARATUS

FIELD OF THE INVENTION

This invention relates to the fishing equipment art, and more particularly to a winding apparatus for removing and installing a fishing line on a fishing reel.

BACKGROUND OF THE INVENTION

Broken fishing lines often occur at the most inopportune places and times. The places and times are in small boats or on shore, especially when fish are biting. A broken line can easily frustrate and spoil what has begun as a relaxing and enjoyable day. Fishing lines also need to be replaced on fishing reels when they are rotted or so badly frayed that they are no longer reliable or when fishing for different sizes and species of fish during changing or special weather conditions. Being able to remove and install a new line quickly and efficiently is a desirable feature for fishermen.

Manually winding and unwinding a fishing line from a reel with inadequate equipment is a boring and time consuming task. Disposing an old line is difficult and problematic. The specialized line winding apparatus which exist in the art have one or more drawbacks. One drawback is that they are not portable, thus unavailable when they are most often needed. Another drawback with power driven winders is that they are expensive and cumbersome. A still further drawback is not being able to accommodate a variety of fishing reel styles.

SUMMARY OF THE INVENTION

The present invention completely overcomes all of the above drawbacks with features which individually and collectively contribute to its ability to quickly and efficiently remove and install fishing lines on a variety of fishing reels, including spinning, bait casting and fly reels. Another benefit of the invention is that it is compact and portable. Still yet another benefit is that it is moderate in cost. Still yet another benefit is that it can operate with DC and AC power supplies.

In a first aspect of the invention, the winding apparatus comprises an enclosure, a motor drive unit, and a control system for changing speed and direction of the motor drive unit. The motor drive unit includes an electric motor, pulleys and a belt. One feature of the motor drive unit is that the pulleys and belt are used for different style reels. In a second aspect, a manual drive unit is used in place of the motor drive unit.

In employing the teaching of the present invention, a plurality of alternate constructions can be adopted to achieve the desired results and capabilities. In this disclosure, only two embodiments are discussed. However, these embodiments are intended as examples and should not be considered as limiting the scope of the invention.

Further features and benefits will be apparent by reference to the drawings and ensuing detailed description of a preferred embodiment which discloses the best mode contemplated in carrying out the invention. The exclusive rights which are claimed are set forth in the numbered claims following the detailed description of the preferred embodiment.

BRIEF DESCRIPTION OF THE DRAWINGS

The invention will be better understood and further objects, characterizing features, details and advantages thereof will appear more clearly with reference to the diagrammatic drawings illustrating specific embodiments of the invention by way of non-limiting example only.

DETAILED DESCRIPTION OF THE PREFERRED EMBODIMENTS

Figure 1:
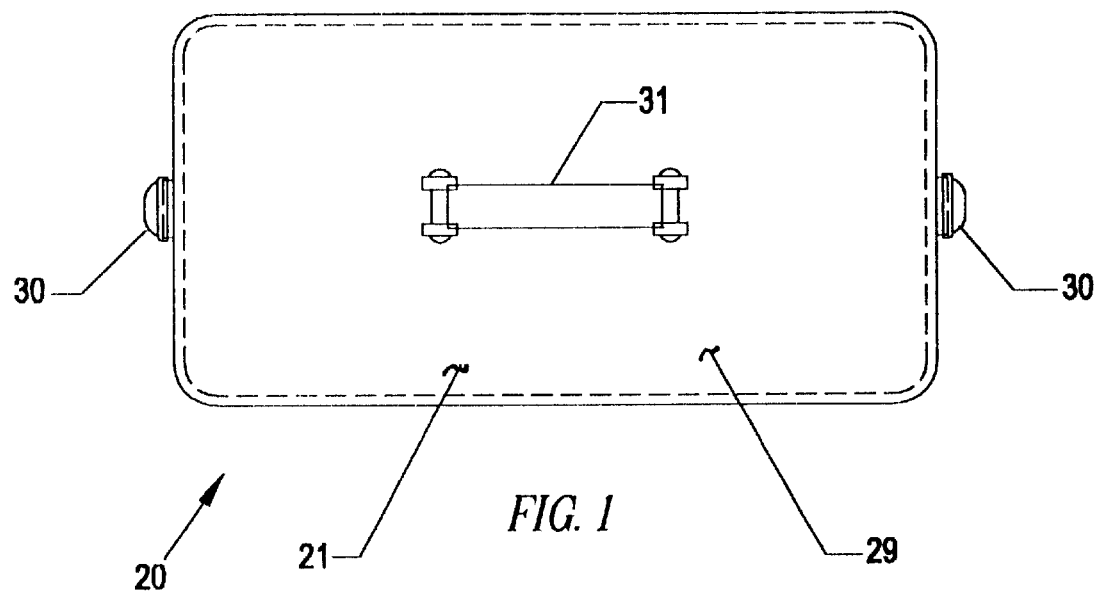
FIG. 1 is a plan view of a fishing line winding apparatus which is exemplary of the present invention.
Figure 2:
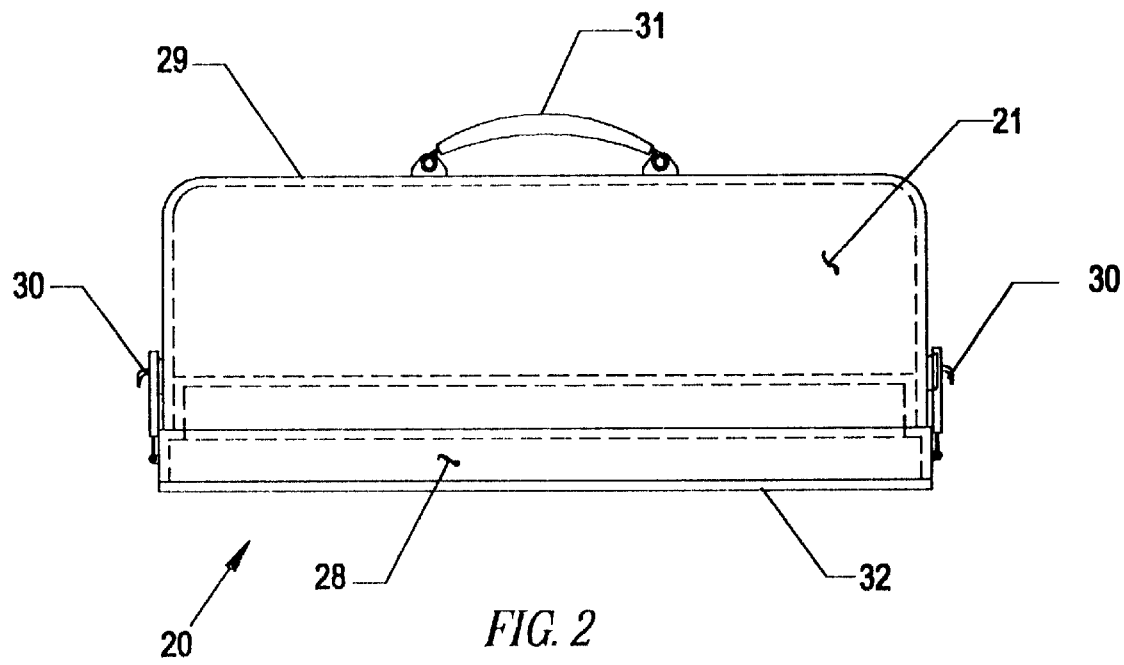
FIG. 2 is a side view of the winding apparatus of FIG. 1.

The following descriptions of the preferred embodiments are merely exemplary in nature and are in no way intended to limit the invention or its application or uses. With reference to the drawings, in which like numerals designate like and corresponding parts throughout the several views, a portable fishing line winding apparatus 20 is shown in FIGS. 1 through 5, inclusive, which embodies the present invention. The compact winding apparatus 20 is intended to be used in boats as well as locations such as homes and bait shops. The apparatus 20 generally includes a carrying case 21, a drive unit, a DC motor 27, a conventional power supply and a conventional electronic control system. Alternate DC and AC power supplies are provided. With reference to FIG. 2, the case 21 includes a molded base 28 and a removable cover 32 which is attached to the base 28 with a pair of conventional clasps 30. On an upper portion of the cover 29 is a handle 31 for carrying the apparatus 20.

On the bottom of the base 28 there is a removable cover 32 for access to the interior of the base 28. A smaller cover 33 is attached to the lower access cover 32 for replacing batteries 25 of the DC power supply. Centrally located on top of the base 28 are four knobs. One knob 34 which is marked On/Off is used for starting and stopping the winding apparatus 20. A second knob 35 which is marked AC/DC is used for switching between the DC power supply and the AC line supply. A third knob 36 which is marked Fwd/Rev is used for reversing the rotation of the DC motor 27 to remove and add a fishing line 49 to a bait casting reel 39 mounted on the base 28.

A fourth knob 37 which is marked Speed is used for changing the speed of the motor 27. At one end of the base is a socket 38 for connecting an AC cord (not shown). The battery 25 and a control system printed circuit board 24 are mounted on the lower access cover 32 which is attached to the bottom of the base 28.

Figure 5:
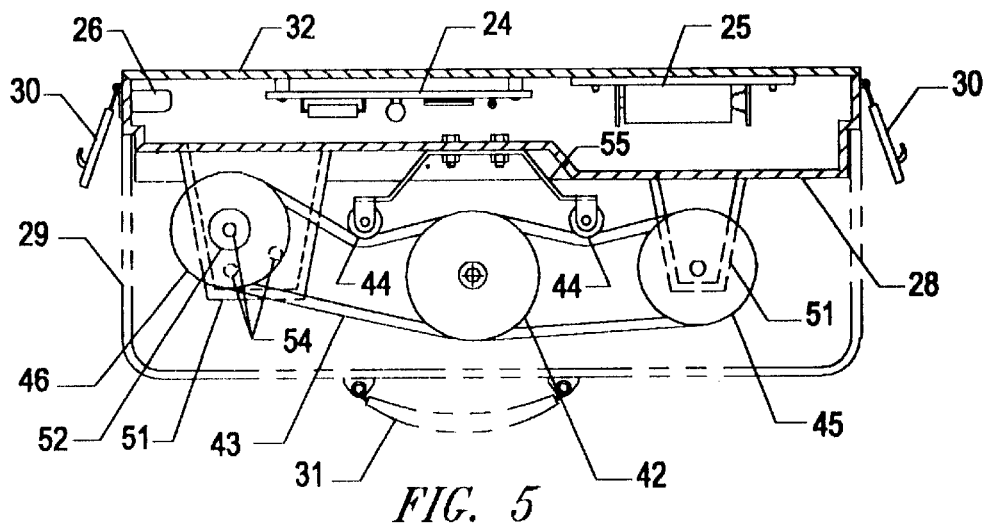
FIG. 5 is a cross-sectional view taken on the line 5—5 in FIG. 3.
Figure 3:
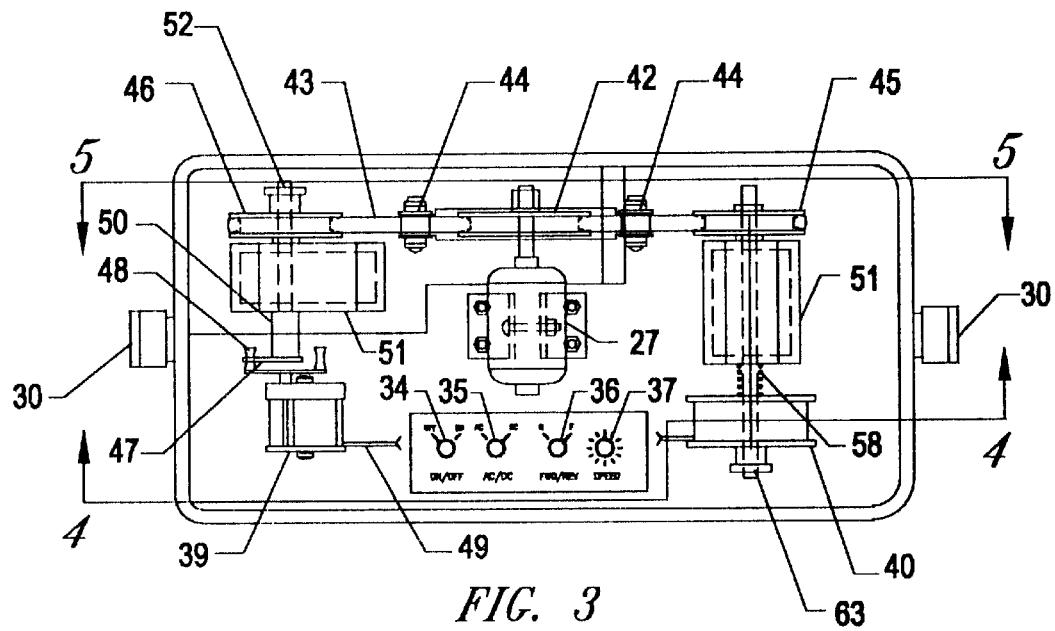
FIG. 3 is a plan view of the winding apparatus of FIG. 1 with a cover removed and a bait casting reel and a line storage spool mounted in the apparatus.
Figure 4:
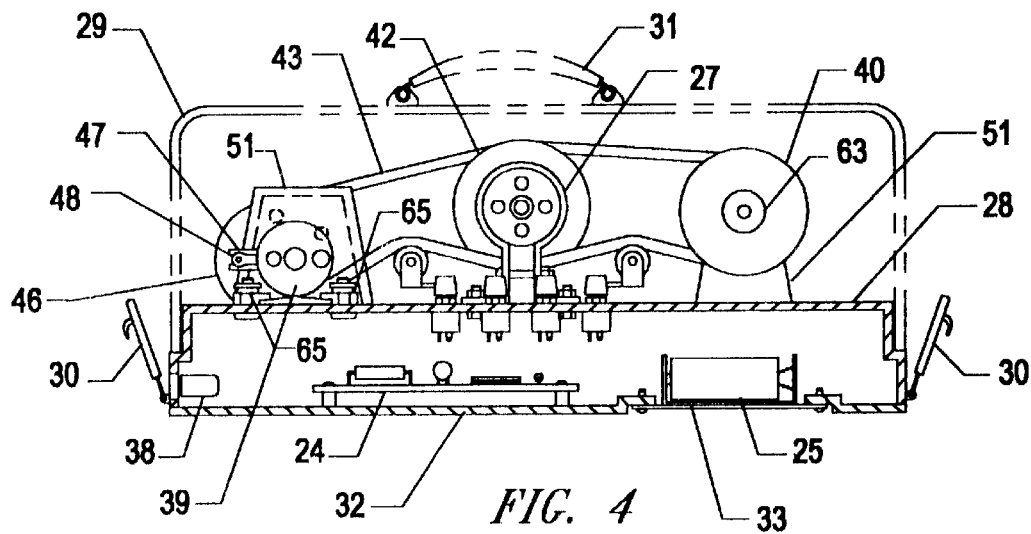
FIG. 4. is a cross-sectional view taken on the line 4—4 in FIG. 3.

The operation of the winding apparatus 20 is best understood by reference to FIGS. 3–5. wherein the cover 29 is removed. The bait casting reel 39, storage spool 40, motor 27 and motor drive unit are mounted on an upper surface of the base 28. The motor drive unit includes the motor 27, a motor pulley 42, a bait casting reel pulley 46, a line storage spool pulley 45, a pair of idler pulleys 44 and a V-belt 43. One important feature of the invention 20 is that the drive unit members 27, 42, 44, 46, and 43 are linearly arranged. The linear arrangement reduces size, complexity and cost. The particular linear arrangement also improves reliability. Belt wear and belt slippage of the linear arrangement are reduced by the resiliently mounted idler pulleys 44 which take up belt slack and increase the wrap of the belt 43 around the motor pulley 42. The idler pulleys 44 are mounted on the ends of a flat leaf spring 55 which is attached to the base 28.

Another feature of the invention is the method of mounting the bait casting reel pulley 46 and line storage spool pulley 45. The pulleys 46 and 45 are attached to shafts which are mounted for rotation in pedestals 51 which are molded integrally with the base 28. At an end portion of a shaft 50 which supports the casting reel pulley 44, is a rotating arm 47 which engages and drives a crank 48 of the bait casting reel 39. The motor pulley 42 is fixed to an output shaft of the DC motor 27.

The means for accommodating the alternate type fishing reels is another feature of the invention 20. As will be later shown, alternate type fishing reels are attached to the base 28 at a common location with a pair of cleats 65. Differences in reels are resolved by a series of holes 54 in the pedestal 51 of the bait casting reel pulley 46 and the replacement of the shaft 50 which drives a crank 48 of a reel. To replace the shaft 50 it is only necessary to remove a thumb nut 52 at the end of the shaft 50, install an alternate shaft in a proper hole 54 and re-install the nut 52. When a new shaft 50 is installed, belt slack is eliminated by the leaf spring 55 which supports the idler pulleys 44.

Figure 8:
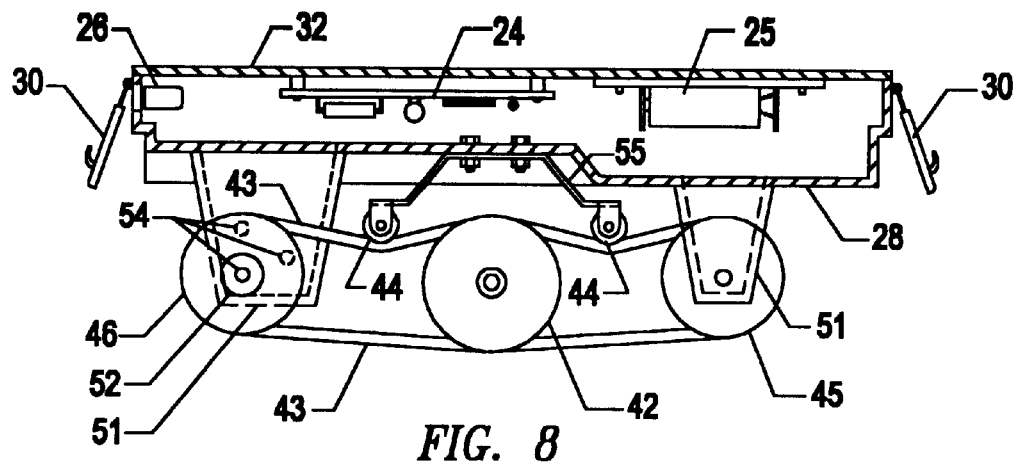
FIG. 8 is a cross-sectional view taken on the line 8—8 in FIG. 6.
Figure 6:
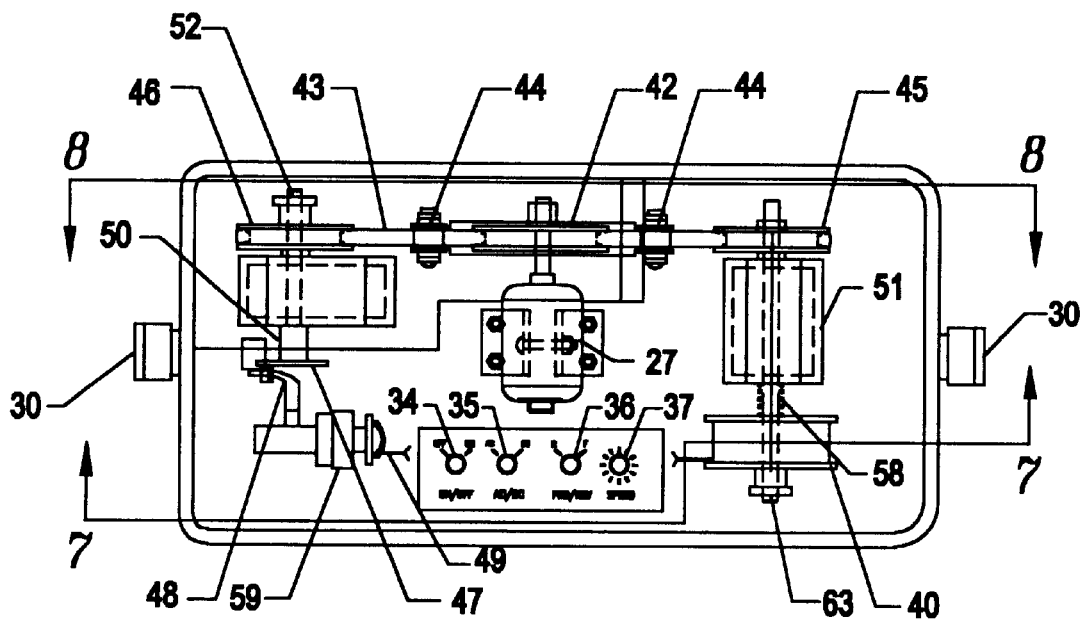
FIG. 6 is a plan view of the winding apparatus with the cover removed showing a spinning reel mounted in the apparatus.
Figure 7:
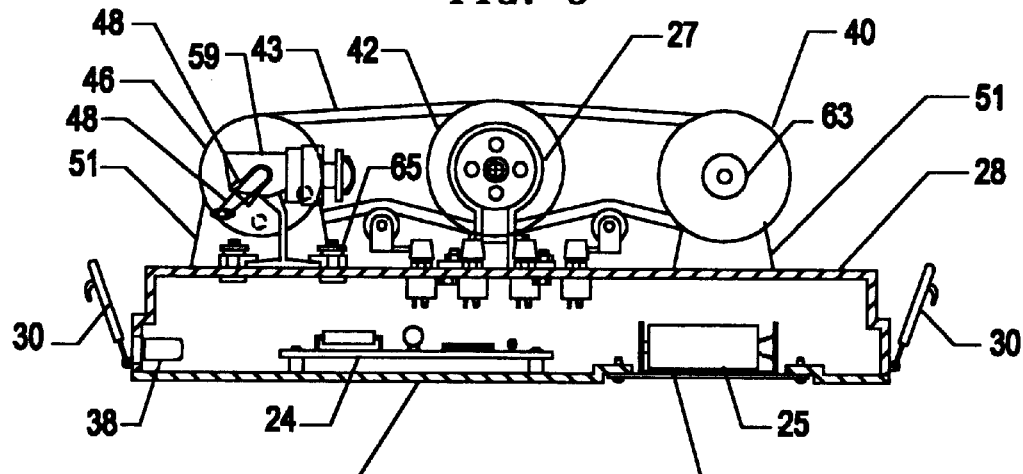
FIG. 7 is a cross-sectional view taken on the line 7—7 in FIG. 6.
Figure 11:
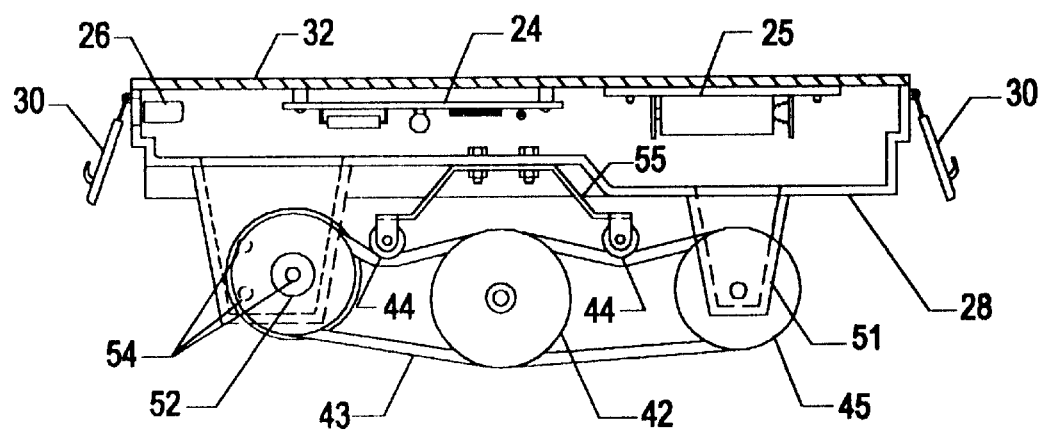
FIG. 11 is a cross-sectional view taken on the line 11—11 in FIG. 9.
Figure 9:
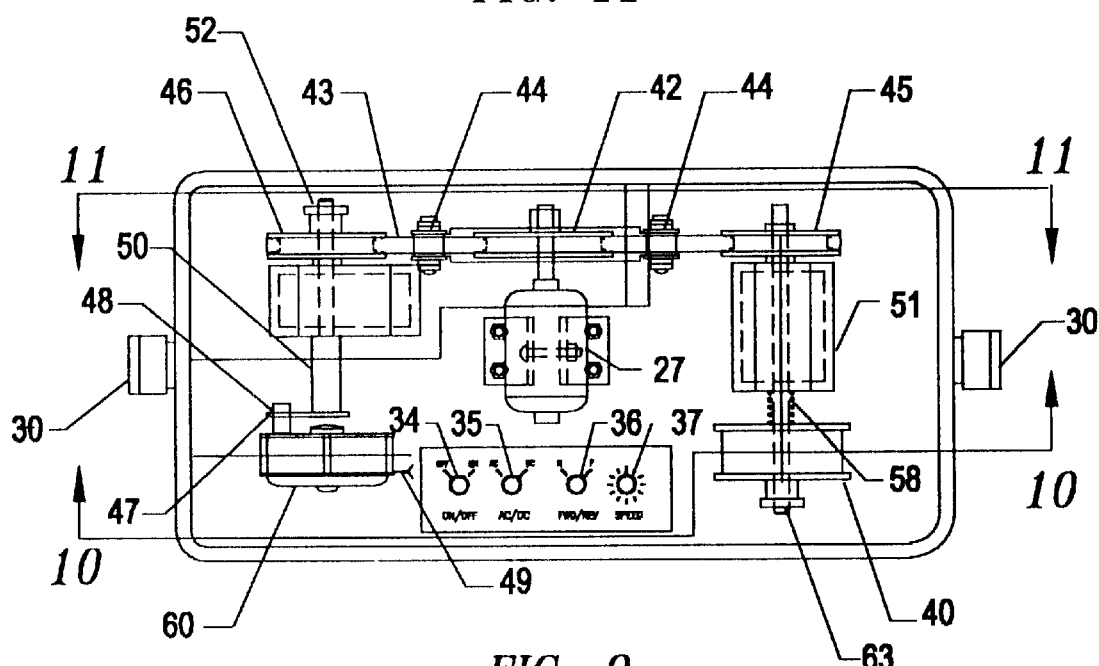
FIG. 9 is a plan view of the winding apparatus with the cover removed showing a fly reel mounted in the apparatus.
Figure 10:
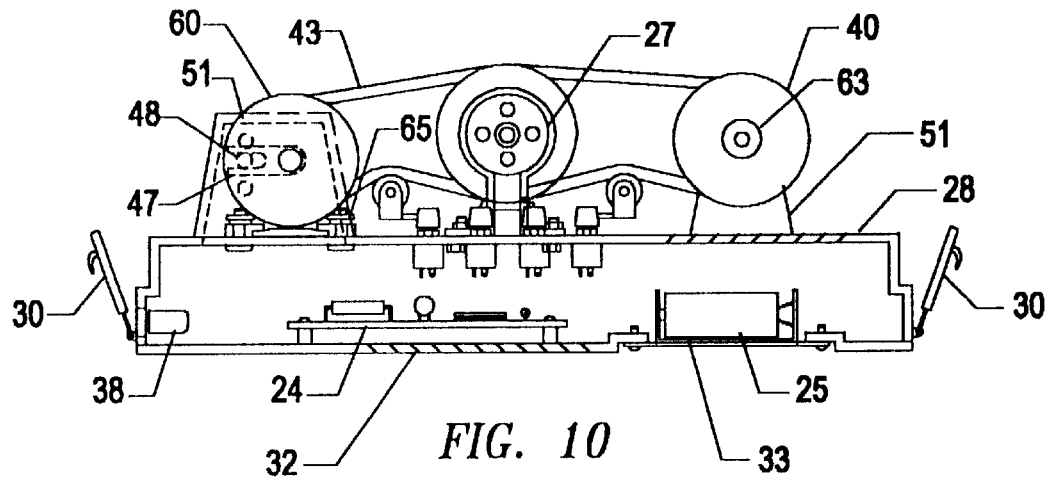
FIG. 10. is a cross-sectional view taken on the line 10—10 in FIG. 9.
Figure 12:
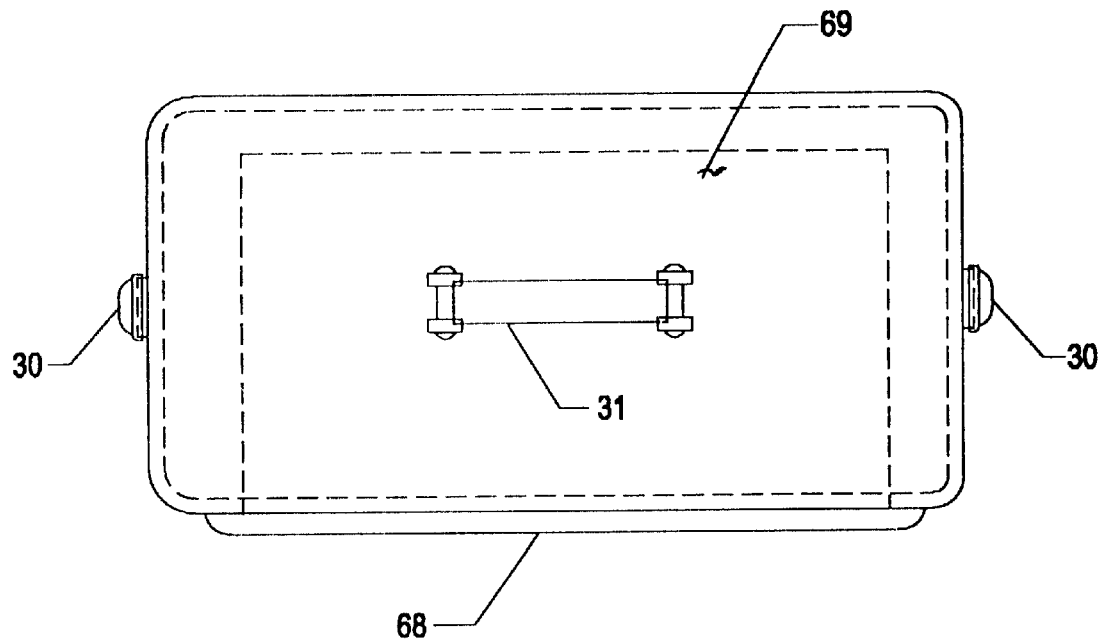
FIG. 12 is a plan view of a manual embodiment.
Figure 13:
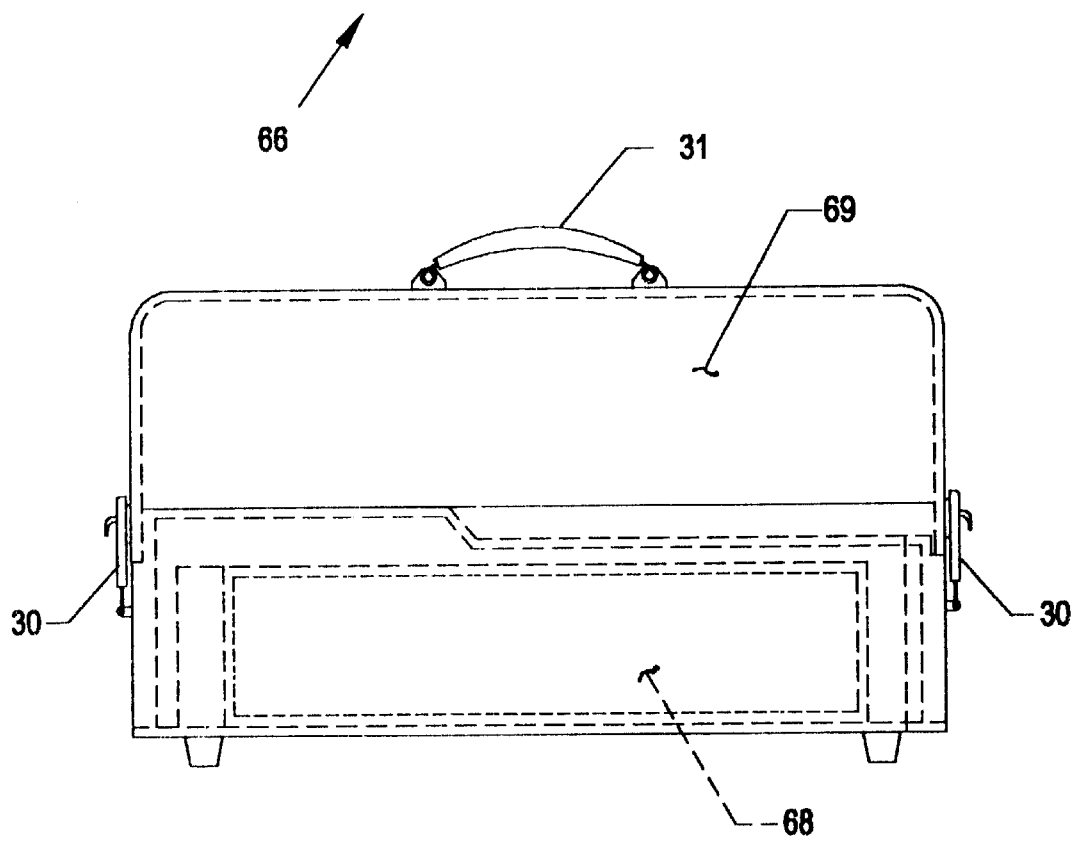
FIG. 13 is a side view of the manual embodiment.
Figures 14, 15, 16:
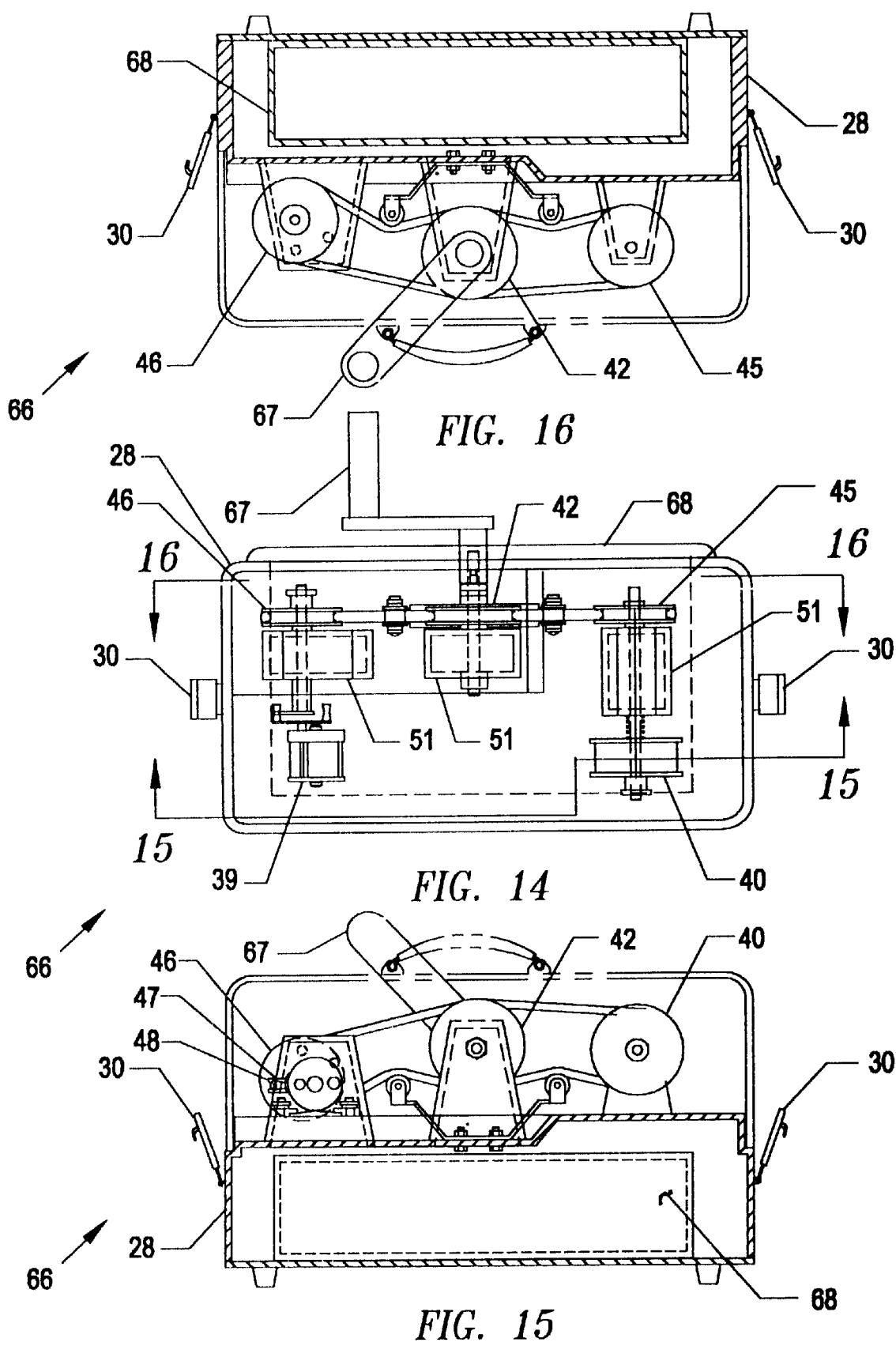
FIG. 14 is a plan view of the manual embodiment with a cover removed and a bait casting reel mounted in the apparatus.
FIG. 15 is a cross-sectional view taken on the line 15—15 in FIG. 14.
FIG. 16 is a cross-sectional view taken on the line 16—16 in FIG. 14.

Still yet another feature of the invention 20 is the means for mounting alternate types of line spools 40. To replace the spool 40, a thumb nut 63 is removed, another spool is installed and the thumb nut 63 is re-installed. Differences in spool width are accommodated by a coil spring 58 on the shaft which carries the spool. In FIGS. 6–8 a spinning reel 59 is shown mounted in the apparatus 20 and in FIGS. 9–11 a fly reel 60 is shown mounted in the apparatus 20.

With reference to FIGS. 12–16, a manual drive apparatus 66 is illustrated according to the present invention. The manual drive apparatus 66 comprises a case 69, a detachable crank 67, and the pulleys 42, 46, 45, and the resiliently mounted idler pulleys 44. A drawer 68 is provided for storing the crank and other items.

The manner of using our invention is as follows. With reference to FIGS. 3–5, an appropriate shaft 50 is installed in one of the holes 54 to align the axis of rotation of the reel pulley 46 with the axis of rotation of the crank 48 of a reel 39, 59 or 60. The crank 48 of the reel 39, 59 or 60 is engaged with the arm 47 and the reel 39, 59 or 60 is attached to the base 28 with the pair of cleats 65 in the previously described manner. A fishing line spool 40 is attached to the shaft of the spool pulley 45 in the previously described manner. If a fishing line 49 on the spool 40 is to be added to the reel 39, 59 or 60, the end of the line 49 is attached to the reel 39, 59 or 60. The appropriate knobs 35–37 on the base 28 are adjusted and the motor 27 is run until the entire line 49 has been added to the reel 39, 59 or 60.

From the above, it will be appreciated that our invention is a novel apparatus for removing and adding fishing lines to fishing reels having numerous features and benefits heretofore unavailable.

Although only two preferred embodiments of our invention have been illustrated, as previously stated, it is not our intent to limit its scope to these embodiments since it is apparent that other embodiments can be derived by persons skilled in the art by obvious changes in size, material, arrangement of parts, reversal of elements, and substitution of parts such as gears in place of pulleys and belts, without departing from the spirit thereof.

What we claim is new is:

1. A winding apparatus for removing and installing a fishing line on a fishing reel comprising: a base; a linearly arranged driving means mounted on said base; said linearly arranged driving means including a first pulley for rotating a crank of a fishing reel; a second pulley for rotating a fishing line storage spool; a third pulley positioned between said first and second pulleys; a belt for operatively connecting said first, second and third pulleys; and a means for rotating said second pulley.

2. The winding apparatus recited in claim 1 further comprising a means for removing slack in said belt.

3. The winding apparatus recited in claim 2 wherein said means for taking up slack in said belt is a resiliently biased means.

4. The winding apparatus recited in claim 2 wherein said means for taking up slack in said belt comprises a spring and at least one idler pulley which is resiliently biased by said spring.

5. The winding apparatus recited in claim 1 further comprising a case for enclosing and transporting said winding apparatus, said case including said base; a removable cover attached to said base; and a means for retaining said cover to said base.

6. The winding apparatus recited in claim 5 wherein said means for retaining said cover to said base is a pair of clasps.

7. The winding apparatus recited in claim 5 wherein said control system further comprises a means for changing the speed of said motor.

8. The winding apparatus recited in claim 1 wherein said means for rotating said third pulley comprises an electric motor; a control system for operating said motor; and a power supply for operating said motor.

9. The winding apparatus recited in claim 8 wherein said control system includes a means for reversing the direction of rotation of said motor.

10. The winding apparatus recited in claim 8 wherein said power supply for operating said motor is a battery DC power supply.

11. The winding apparatus recited in claim 8 wherein said power supply for operating said motor is an AC power supply.

12. The winding apparatus recited in claim 1 wherein said means for rotating said third pulley is a manual crank.

13. The winding apparatus recited in claim 1 wherein said means for taking up slack in said belt comprises: a pair of idler pulleys mounted on said base; and a spring for resiliently biasing said idler pulleys against said belt.

14. The winding apparatus recited in claim 1 further comprising a means for mounting more than one type of fishing reel on said base.

15. The winding apparatus recited in claim 1 wherein said means for mounting more than one type of fishing reel on said base comprises a means for re-positioning said first pulley on said base.

16. The winding apparatus as recited in claim 1 wherein said first pulley for rotating said crank of said fishing reel and said second pulley for rotating said fishing line storage spool are mounted for rotation on integral pedestals of said base.

17. In combination with a fishing reel and a fishing line storage spool, a linear arrangement of a reversible means for rotating a crank of said fishing reel and said fishing line storage spool, said reversible means positioned between said fishing reel and said fishing line storage spool; and a means for operatively connecting said reversible means with said storage reel and said crank of said fishing reel.

18. The combination recited in claim 17 wherein said reversible means is a power operated means.

19. The combination recited in claim 17 wherein said reversible means is a manually operating means.

20. A winding apparatus for removing and installing a fishing line on a fishing reel comprising: a base, a first pulley mounted on said base for rotating a crank of a fishing reel; a second pulley mounted on said base for rotating a line storage spool; a third pulley operatively mounted on said base between and in a linear arrangement with said first pulley and said second pulley; and a reversible means for rotating said crank of said fishing reel and said line storage spool.

21. The winding apparatus recited in claim 20 wherein said winding apparatus is a portable apparatus.

22. A method for installing fishing lines on several types of fishing reels comprising the steps of mounting a first type of fishing reel on a base; operatively connecting a crank of said first type fishing reel with a member which is mounted for rotation on said base such that an axis of rotation of a crank of said fishing reel is aligned with an axis of said first member; mounting an empty fishing line storage spool on a second member which is mounted for rotation on said base and is operatively connected to said first member; connecting a fishing line of said fishing reel to said empty storage spool; rotating said fishing reel and said storage spool to transfer a fishing line from said fishing reel to said empty storage spool; removing said storage spool from said second member; mounting a second spool having a fishing line on said second member; connecting a fishing line of said storage spool to said fishing reel; rotating said fishing reel and said storage spool in a reverse direction to transfer said fishing line to said fishing reel; removing said fishing reel from said first member; relocating said first member on said base; mounting a second type of fishing reel on said base such that an axis of said second type of fishing reel is aligned with said axis of rotation of said first member; connecting a fishing line of said storage reel to said second type of fishing reel; rotating said fishing reel and said storage spool to transfer a fishing line from said storage spool to said second type of fishing reel.

23. The method recited in claim 22 further comprising the step of adjusting a speed of rotation of said fishing reel.

24. The method recited in claim 22 wherein said fishing reels and said storage spools are manually rotated.

25. The method recited in claim 22 wherein said fishing reels and said storage spools are power rotated.

* * * * *